(12) United States Patent
Wu et al.

(10) Patent No.: US 12,209,171 B2
(45) Date of Patent: Jan. 28, 2025

(54) LIQUID EPOXY MOLDING COMPOUND AND PREPARATION METHOD THEREOF

(71) Applicant: Hubei Choice Technology Co., Ltd., Ezhou (CN)

(72) Inventors: De Wu, Ezhou (CN); Shengquan Wang, Ezhou (CN); Shuhang Liao, Ezhou (CN); Junxing Su, Ezhou (CN)

(73) Assignee: Hubei Choice Technology Co., Ltd., Ezhou (CN)

( * ) Notice: Subject to any disclaimer, the term of this patent is extended or adjusted under 35 U.S.C. 154(b) by 0 days.

(21) Appl. No.: 18/826,534

(22) Filed: Sep. 6, 2024

(65) Prior Publication Data

US 2024/0425669 A1   Dec. 26, 2024

Related U.S. Application Data

(63) Continuation of application No. PCT/CN2023/092798, filed on May 8, 2023.

(30) Foreign Application Priority Data

Apr. 26, 2023   (CN) .................. 2023104622949.9

(51) Int. Cl.
*C08K 3/36* (2006.01)
*C08G 59/02* (2006.01)
*C08J 3/12* (2006.01)

(52) U.S. Cl.
CPC .............. *C08K 3/36* (2013.01); *C08G 59/022* (2013.01); *C08J 3/12* (2013.01); *C08J 2363/10* (2013.01); *C08K 2201/005* (2013.01)

(58) Field of Classification Search
CPC .. C08K 3/36; C08K 2201/005; C08G 59/022; C08J 3/12; C08J 2363/10
USPC ............................................. 524/493
See application file for complete search history.

(56) References Cited

FOREIGN PATENT DOCUMENTS

| CN | 111909486 A |   | 11/2020 |           |
|----|-------------|---|---------|-----------|
| CN | 113621332 A | * | 11/2021 | ............ C08G 59/20 |
| CN | 114292613 A |   | 4/2022  |           |

\* cited by examiner

*Primary Examiner* — Ling Siu Cho
*Assistant Examiner* — Ronald Grinsted
(74) *Attorney, Agent, or Firm* — George D. Morgan

(57) ABSTRACT

Disclosed is a liquid epoxy molding compound and a preparation method thereof; the liquid epoxy molding compound includes the following raw materials by mass fraction: an inorganic silicon filler: 83%-88%, a naphthalene-based epoxy resin: 5%-10%, an anhydride curing agent: 5%-10%, and an accelerator: 0.1%-0.5%, where the inorganic silicon filler with a particle size of less than 50 μm-100 μm accounts for 99%; the method includes premixing the naphthalene-based epoxy resin, the curing agent, the accelerator, and the inorganic silicon filler to obtain a mixture; and grinding the mixture to a target particle size, and then performing vacuum degassing to obtain the liquid epoxy molding compound. The small-particle silica is introduced to reduce the increase in length of the liquid epoxy molding compound at the unit temperature during the molding stage.

5 Claims, 3 Drawing Sheets

LIQUID EPOXY MOLDING COMPOUND AND PREPARATION METHOD THEREOF

CROSS-REFERENCE TO RELATED APPLICATIONS

The present disclosure claims priority to Chinese Patent Application No. 202310462294.9, filed on Apr. 26, 2023 and titled "LIQUID EPOXY MOLDING COMPOUND AND PREPARATION METHOD THEREOF", which is incorporated by reference herein in its entirety.

TECHNICAL FIELD

The present disclosure relates to the field of microelectronic packaging materials, and in particular, to a liquid epoxy molding compound and a preparation method thereof.

BACKGROUND

With the development of electronic products towards miniaturization, semiconductor sealing structures used for packaging electronic products have also embarked on the path of being light, thin, and short. Traditional structural materials for packaging generally use epoxy molding compounds, which cannot meet harsh conditions such as shortening the distance between metal leads in electronic products and thinning the thickness of the packaging device due to miniaturization. As a representative packaging material for the third technological revolution in microelectronic packaging, liquid epoxy packaging materials are one of the key packaging materials required for ball grid array packaging and chip scale packaging and are mainly prepared from low-viscosity liquid cycloaliphatic epoxy resins, spherical silica powder, epoxy curing agents and accelerators, silica powder surface treatment agents, and other functional additives through appropriate processes. Since the liquid-sealed epoxy packaging materials are subject to surface tension and intermolecular forces during the packaging and molding stage, the edges of the electronic products packaged with the liquid-sealed epoxy packaging materials will warp to varying degrees. Especially for chip packaging, the packaged chips will warp to varying degrees. If the warpage height is too high, the packaged electronic products will become unusable.

Assuming that the warpage height of a liquid epoxy molding compound is calculated as 7.5 cm×2.5 cm×0.1 cm, when the warpage height is above 3 cm, although the packaging thickness is appropriate, excessive warpage will affect the use of the packaged chip. Moreover, the warpage height of general packaged chips is required to range between 2 cm and 3 cm for easy use and packaged products with a warpage height of more than 3 cm will be treated as defective products in industrial production, which indirectly increases packaging costs. Therefore, how to provide a liquid epoxy molding compound with a low warpage height to achieve low-cost packaging of electronic products is a technical problem that needs to be solved urgently.

SUMMARY

The present disclosure is intended to provide a liquid epoxy molding compound and a preparation method thereof to solve the technical problem that the warpage height of the liquid epoxy molding compounds in the prior art is too high.

In a first aspect of the present disclosure, a liquid epoxy molding compound is provided and includes the following raw materials by mass fraction: an inorganic silicon filler: 83%-88%, a naphthalene-based epoxy resin: 5%-10%, an anhydride curing agent: 5%-10%, and an accelerator: 0.1%-0.5%, where the inorganic silicon filler with a particle size of less than 50 μm-100 μm accounts for 99%.

In a second aspect of the present disclosure, a method for preparing the liquid epoxy molding compound according to the first aspect is provided, including: premixing the naphthalene-based epoxy resin, the curing agent, the accelerator, and the inorganic silicon filler to obtain a mixture; and grinding the mixture to a target particle size, and then performing vacuum degassing to obtain the liquid epoxy molding compound.

DETAILED DESCRIPTION OF THE EMBODIMENTS

Figure 1:
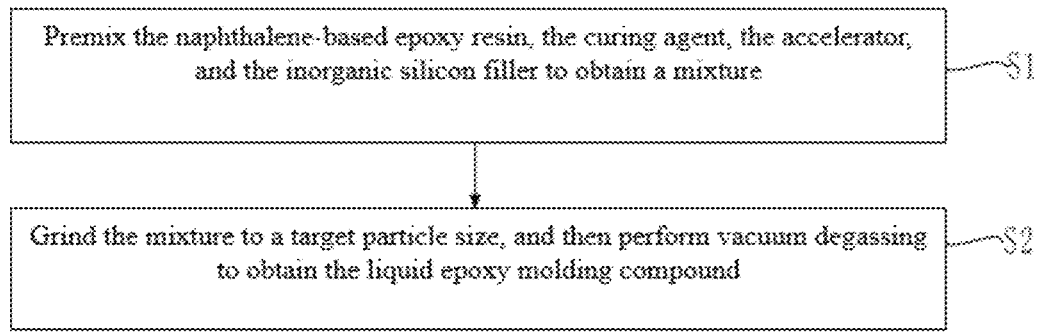
FIG. 1 is a schematic flow chart of preparing a liquid epoxy molding compound in accordance with some embodiments of the present disclosure.

The present disclosure will be described in detail below with reference to specific implementation manners and embodiments, from which the advantages and various beneficial effects of the present disclosure will be more clearly presented. Those skilled in the art should understand that these specific implementation manners and embodiments are used to illustrate rather than to limit the present disclosure. Throughout the present disclosure, unless otherwise specifically stated, the terms as used herein should be understood as having the meaning commonly used in the art.

Therefore, unless otherwise defined, all technical and scientific terms as used herein have the same meaning as commonly understood by those skilled in the art of the present disclosure. If there is any conflict, the present disclosure should prevail. Unless otherwise specified, various raw materials, reagents, instruments, devices, and the like as used herein can be purchased in the market or obtained through existing methods.

Various embodiments of the present disclosure may exist in the form of a range. It should be understood that the description in the form of a range is only for convenience and simplicity and should not be understood as a hard limit to the scope of the present disclosure; therefore, the described range should be considered to have specifically disclosed all possible subranges as well as single numerical values within such ranges. For example, a description of a range from 1 to 6 should be considered to have specifically disclosed subranges, such as from 1 to 3, from 1 to 4, from 1 to 5, from 2 to 4, from 2 to 6, and from 3 to 6, and a single numerical value within the described range, such as 1, 2, 3, 4, 5, and 6, should apply regardless of the range. Additionally, whenever a numerical range is indicated herein, it is intended to include any cited numerical value (fractional or integral) within the indicated range. Unless conversely specified, the directional terms as used herein, such as "up" and "down", refer to the directions relative to the accompanying drawings. Additionally, in the description of the present disclosure, the terms such as "including" and "comprising" mean "including but not limited to". Moreover, the terms "include", "comprise", or any other variants thereof are intended to cover non-exclusive inclusion so that a process, method, item, or device including a series of elements includes not only those elements but also other elements not explicitly listed, or further includes inherent elements of such process, method, item, or device. The relational terms such as "first" and "second" are used herein only for distinguishing one entity or operation from another entity or operation and do not necessarily require or imply the existence of any such actual relationship or sequence between these entities or operations. As used herein, the term "and/or" is only an association relationship describing associated objects, indicating that there may be three relations, for example, A and/or B may indicate the following three cases: A exists individually, A and B exist simultaneously, and B exists individually. An association relationship between three or more associated objects described by "and/or" means that any one of the three associated objects can exist alone, or at least two of them can exist at the same time, for example, for A and/or B and/or C, it can mean that any one of A, B, and C exists alone, or any two of them exist at the same time, or three of them exist at the same time. As used herein, "at least one" refers to one or more, and "a plurality of" refers to two or more. "At least one", "at least one of the following", or similar expressions thereof refer to any combination of involved objects, including any combination of single objects or plural objects. For example, "at least one of a, b, or c", or "at least one of a, b, and c" can both mean a, b, c, a-b (i.e., a and b), a-c, b-c, or a-b-c, where a, b, and c can be singular or plural respectively.

The present disclosure provides a liquid epoxy molding compound, including the following raw materials by mass fraction: an inorganic silicon filler: 83%-88%, a naphthalene-based epoxy resin: 5%-10%, an anhydride curing agent: 5%-10%, and an accelerator: 0.1%-0.5%, where the inorganic silicon filler with a particle size of less than 50 μm-100 μm accounts for 99%.

The beneficial effects of controlling the mass fraction of the inorganic silicon filler to 83%-88% lie in that within the range, the inorganic silicon filler can not only reduce shrinkage of the liquid epoxy molding compound but also empower the liquid epoxy molding compound with appropriate mechanical properties and thermal conductivity and reduce the expansion coefficient of the liquid epoxy molding compound. The beneficial effects of controlling the mass fraction of the naphthalene-based epoxy resin to 5%-10% lie in that within the range, as a substrate, the naphthalene-based epoxy resin has greater rigidity and a larger storage modulus after curing than other epoxy resins, thereby improving the mechanical properties of the liquid epoxy molding compound. The beneficial effects of controlling the mass fraction of the anhydride curing agent to 5%-10% lie in that within the range, the curing effect of the anhydride curing agent can be improved, thereby achieving rapid curing of the liquid epoxy molding compound from liquid to solid to form a packaging structure that meets an expected warpage height. The beneficial effects of controlling the mass fraction of the accelerator to 0.1%-0.5% lie in that within the range, the accelerator can catalyze rapid curing of the naphthalene-based epoxy resin, thereby improving the curing effect of the liquid epoxy molding compound. The beneficial effects of controlling the inorganic silicon filler with a particle size of less than 50 μm-100 μm to account for 99% lie in that since the degree of warpage of the liquid epoxy molding compound is related to its coefficient of thermal expansion, and the smaller the coefficient of thermal expansion, the smaller the degree of warpage, controlling the particle size of the inorganic silicon filler can effectively reduce the coefficient of thermal expansion of the liquid epoxy molding compound, thereby reducing the degree of warpage of the packaging structure formed after curing of the liquid epoxy molding compound.

In some implementation manners, the inorganic silicon filler includes inorganic silica.

By defining the inorganic silicon filler, the mechanical properties and heat resistance of the liquid epoxy molding compound can be improved through the inorganic silica and gaps between particles can be reduced through fine particles of the inorganic silica, thereby reducing the coefficient of thermal expansion of the liquid epoxy molding compound to obtain the liquid epoxy molding compound that meets an expected warpage height.

In some implementation manners, the naphthalene-based epoxy resin includes 3,4-epoxycyclohexylmethyl-3',4'-epoxycyclohexylcarboxylate.

The naphthalene-based epoxy resin is controlled by using the 3,4-epoxycyclohexylmethyl-3',4'-epoxycyclohexylcarboxylate to uniformly disperse the inorganic silicon filler, and the naphthalene-based epoxy resin can also cooperate with the curing agent to achieve rapid curing of the liquid epoxy molding compound.

In some implementation manners, the anhydride curing agent includes tetrahydrophthalic anhydride.

By defining the anhydride curing agent, the curing effect can be further improved, thereby achieving rapid curing of the liquid epoxy molding compound to form a packaging structure that meets an expected warpage height.

In some implementation manners, the accelerator includes 2-ethyl-4-methylimidazole.

By defining the accelerator, the effect of the accelerator on catalyzing rapid curing of the naphthalene-type epoxy resin can be promoted and the accelerator can be controlled to only react at a certain temperature, thereby achieving rapid curing of the liquid epoxy molding compound while ensuring its convenience of use.

Referring to FIG. 1, the present disclosure provides a method for preparing the liquid epoxy molding compound, including: S1. premixing the naphthalene-based epoxy resin, the curing agent, the accelerator, and the inorganic silicon filler to obtain a mixture; and S2. grinding the mixture to a target particle size, and then performing vacuum degassing to obtain the liquid epoxy molding compound.

By first premixing and then grinding, the particle size of the inorganic silicon filler can be further refined, thereby further reducing the coefficient of thermal expansion of the liquid epoxy molding compound and the warpage height of a packaging structure formed by the liquid epoxy molding compound. The method is for preparing the above-described liquid epoxy molding compound, the composition and ratio of which can be referred to the above embodiments. Since part or all of the technical solutions of the above-mentioned embodiments are adopted by the method, the method has at least all the beneficial effects brought by the technical solutions of the above-mentioned embodiments, which will not be elaborated herein again.

In some implementation manners, the premixing includes premixing by combining a first revolution stirring and a first rotation stirring; a speed of the first revolution stirring is 800 rpm-1400 rpm; and/or, a speed of the first rotation stirring is 500 rpm-1000 rpm; and/or, the premixing lasts for 150 s-300 s.

By controlling both the speed of the first revolution stirring and the first rotation stirring in the premixing stage and the time of the premixing simultaneously, the mixing degree of the raw materials can be promoted, thereby enabling uniform distribution of the inorganic silicon filler in the liquid epoxy molding to enhance the effect of the inorganic silicon filler on reducing the coefficient of thermal expansion of the liquid epoxy molding compound.

In some implementation manners, the target particle size is 25 µm-50 µm.

By controlling the target particle size, not only the particle size of the inorganic silicon filler can be further reduced but also the inorganic silicon filler can be enabled to reduce the coefficient of thermal expansion of the liquid epoxy molding compound. A grinding machine with three rollers is used for the grinding, where a gap between inlets of the three rollers is set to 50 µm-100 µm and a gap between outlets of the three rollers is set to 25 µm-50 µm so that the particle size of the inorganic silicon filler entering the grinding stage can fall within the range of 50 µm-100 µm to avoid presence of large particles of the inorganic silicon filler in the liquid epoxy molding compound, which will impair the effect of the inorganic silicon filler on reducing the coefficient of thermal expansion of the liquid epoxy molding compound.

In some implementation manners, a vacuum degree of the vacuum degassing is ≤100 kPa.

By controlling the vacuum degree of the vacuum degassing, bubbles in the formed liquid epoxy molding compound can be reduced or even prevented from affecting distribution of the inorganic silicon filler, thereby enhancing the effect of the inorganic silicone filler on reducing the coefficient of thermal expansion of the liquid epoxy molding compound.

In some implementation manners, the vacuum degassing includes degassing by combining a second revolution stirring and a second rotation stirring; a speed of the second revolution stirring is 800 rpm-1400 rpm; and/or, a speed of the second rotation stirring is 80 rpm-140 rpm; and/or, the degassing lasts for 60 s-90 s.

By controlling both the speed of the second revolution stirring and the second rotation stirring in the vacuum degassing stage and the time of the vacuum degassing simultaneously, not only bubbles in the formed liquid epoxy molding compound can be reduced through stirring but also the ingredients can be uniformly mixed, thereby enhancing the effect of the inorganic silicon filler on reducing the coefficient of thermal expansion of the liquid epoxy molding compound.

The present disclosure will be further described below with reference to specific examples. It should be understood that these examples are only intended to illustrate the present disclosure rather than to limit the scope of the present disclosure. The experimental methods in the following examples are generally carried out in accordance with national standards if no conditions are indicated herein. If there is no corresponding national standard, general international standards, conventional conditions, or conditions recommended by the manufacturer should be followed.

Example 1: the liquid epoxy molding compound includes the following raw materials by mass fraction: silica: 86%, 3,4-epoxycyclohexylmethyl-3',4'-epoxycyclohexylcarboxylate: 7%, tetrahydrophthalic anhydride: 7%, and 2-ethyl-4-methylimidazole: 0.3%, where the inorganic silicon filler with a particle size of less than 75 µm accounts for 99%, and a scanning electron microscope image of the silica is shown in FIG. 4. The steps for preparing the above-mentioned liquid epoxy molding compound are as follows: 1. dosing: add each ingredient into a stirring cup; 2. premixing: put the stirring cup filled with the ingredients into a stirrer for revolution stirring at a speed of 1000 rpm or rotation stirring at a speed of 800 rpm for 200 s; 3. grinding: add the premixed material after stirring to a grinding machine with three rollers, with a gap between inlets of the three rollers being 100 µm and a gap between outlets of the three rollers being 50 µm; 4. degassing: put the stirring cup filled with the ground material into the stirrer for degassing under a vacuum degree of −100 kPa by revolution stirring at a speed of 1000 rpm or by rotation stirring at a speed of 100 rpm for 80 s.

Example 2: compared with Example 1, Example 2 differs in that the liquid epoxy molding compound includes the following raw materials by mass fraction: silicon: 86%, 3,4-epoxycyclohexylmethyl-3',4'-epoxycyclohexylcarboxylate: 7%, tetrahydrophthalic anhydride: 7%, and 2-ethyl-4-methylimidazole: 0.3%, where the inorganic silicon filler with a particle size of less than 75 µm accounts for 99%. The steps for preparing the above-mentioned liquid epoxy molding compound are as follows: 1. dosing: add each ingredient into a stirring cup; 2. premixing: put the stirring cup filled with the ingredients into a stirrer for revolution stirring at a speed of 1000 rpm or rotation stirring at a speed of 800 rpm for 200 s; 3. grinding: add the premixed material after stirring to a grinding machine with three rollers, with a gap between inlets of the three rollers being 60 µm and a gap between outlets of the three rollers being 30 µm; 4. degassing: put the stirring cup filled with the ground material into the stirrer for degassing under a vacuum degree of −100 kPa by revolution stirring at a speed of 1000 rpm or by rotation stirring at a speed of 100 rpm for 80 s.

Comparative Example 1: compared with Example 1, Comparative Example 1 differs in that the liquid epoxy molding compound includes the following raw materials by mass fraction: silicon: 86%, 3,4-epoxycyclohexylmethyl-3', 4'-epoxycyclohexylcarboxylate: 7%, tetrahydrophthalic anhydride: 7%, and 2-ethyl-4-methylimidazole: 0.3%, where the inorganic silicon filler with a particle size of 75 µm accounts for 99%. The steps for preparing the above-mentioned liquid epoxy molding compound are as follows: 1. dosing: add each ingredient into a stirring cup; 2. premixing: put the stirring cup filled with the ingredients into a stirrer for revolution stirring at a speed of 1000 rpm or rotation stirring at a speed of 800 rpm for 200 s; 3. grinding: add the premixed material after stirring to a grinding machine with three rollers, with a gap between inlets of the three rollers being 200 µm and a gap between outlets of the three rollers being 100 µm; 4. degassing: put the stirring cup filled with the ground material into the stirrer for degassing under a vacuum degree of −100 kPa by revolution stirring at a speed of 1000 rpm or by rotation stirring at a speed of 100 rpm for 80 s.

Comparative Example 2: compared with Example 1, Comparative Example 2 differs in that the liquid epoxy molding compound includes the following raw materials by mass fraction: silica: 86%, 3,4-epoxycyclohexylmethyl-3', 4'-epoxycyclohexylcarboxylate: 7%, tetrahydrophthalic anhydride: 7%, and 2-ethyl-4-methylimidazole: 0.3%, where the inorganic silicon filler with a particle size of less than 75 µm accounts for 99%. The steps for preparing the above-mentioned liquid epoxy molding compound are as follows: 1. dosing: add each ingredient into a stirring cup; 2. premixing: put the stirring cup filled with the ingredients into a stirrer for revolution stirring at a speed of 1000 rpm or rotation stirring at a speed of 800 rpm for 200 s; 3. grinding: add the premixed material after stirring to a grinding machine with three rollers, with a gap between inlets of the three rollers being 150 µm and a gap between outlets of the three rollers being 75 µm; 4. degassing: put the stirring cup filled with the ground material into the stirrer for degassing under a vacuum degree of −100 kPa by revolution stirring at a speed of 1000 rpm or by rotation stirring at a speed of 100 rpm for 80 s.

Comparative Example 3: compared with Example 1, Comparative Example 3 differs in that the liquid epoxy molding compound includes the following raw materials by mass fraction: silica: 86%, 3,4-epoxycyclohexylmethyl-3',4'-epoxycyclohexylcarboxylate: 7%, tetrahydrophthalic anhydride: 7%, and 2-ethyl-4-methylimidazole: 0.3%, where the inorganic silicon filler with a particle size of 75 μm accounts for 50%. The steps for preparing the above-mentioned liquid epoxy molding compound are as follows: 1. dosing: add each ingredient into a stirring cup; 2. premixing: put the stirring cup filled with the ingredients into a stirrer for revolution stirring at a speed of 1000 rpm or rotation stirring at a speed of 800 rpm for 200 s; 3. grinding: add the premixed material after stirring to a grinding machine with three rollers, with a gap between inlets of the three rollers being 10 μm and a gap between outlets of the three rollers being 5 μm; 4. degassing: put the stirring cup filled with the ground material into the stirrer for degassing under a vacuum degree of −100 kPa by revolution stirring at a speed of 1000 rpm or by rotation stirring at a speed of 100 rpm for 80 s.

Figure 2:
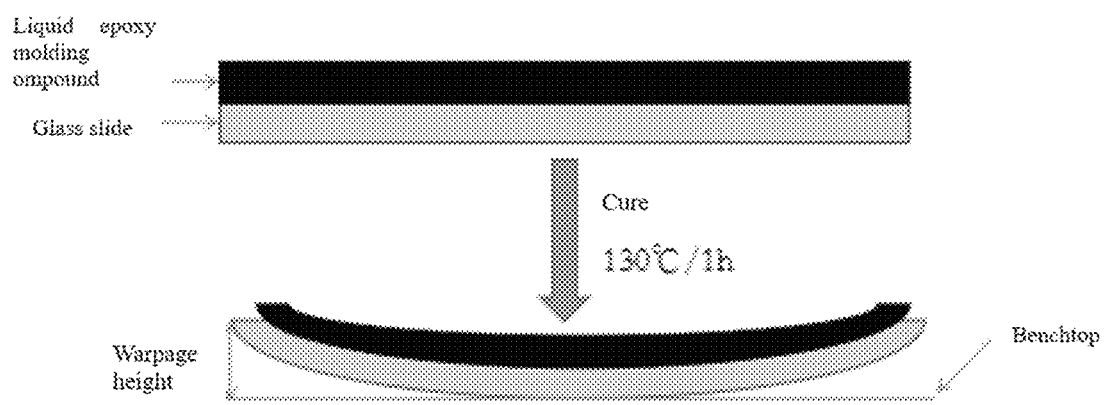
FIG. 2 is a schematic diagram of a warpage height test method in accordance with some embodiments of the present disclosure.

Relevant experiments and effect data: warpage test method: load the liquid epoxy molding compound obtained in each example and comparative example evenly on a glass slide (7.5 cm×2.5 cm×0.1 cm), with a thickness of 0.1 cm and at a curing condition of 130° C./1 h; after cooling, measure the height of one end of the glass slide, which is the warpage height, as shown in FIG. 2. The measurement results are listed in Table 1. Test method for the coefficient of thermal expansion in accordance with ASTM E831-2019: take a sample that is fully cured at 150° C. for 1 h, and prepare a test specimen with a size of 5 mm×5 mm×2 mm; test the coefficient of thermal expansion of the test specimen using TMA (compression mode), with TMA parameter settings as follows: preloading force: 0.05 N, first scanning: room temperature—250° C. (heating rate of 10° C./min), and second scanning: room temperature—250° C. (heating rate of 10° C./min); take the curve data of the second heating section, with the temperature range of CTE1 being 40° C.-100° C. and the temperature range of CTE2 being 150° C.-200° C. The measurement results are listed in Table 1. Particle size test method: test the particle size using a laser particle size analyzer. The measurement results are listed in Table 1.

TABLE 1

Test Results of the Liquid Epoxy Molding Compound Obtained in Each Example and Comparative Example

| Group | Viscosity (Pa · s) | CTE1/CTE2 (pm/° C.) | Particle Size D99 (μm) | Warpage (mm) |
|---|---|---|---|---|
| Example 1 | 620 | 10.4/64.2 | 50 | 0.2 |
| Example 2 | 750 | 7.6/48.6 | 30 | 0 |
| Comparative Example 1 | 350 | 18.5/86.4 | 100 | 1.2 |
| Comparative Example 2 | 440 | 15.2/80.2 | 75 | 1.0 |
| Comparative Example 3 | 2560, unusable due to a too large viscosity | 4.7/45.8 | 5 | Untestable |

Figure 3:
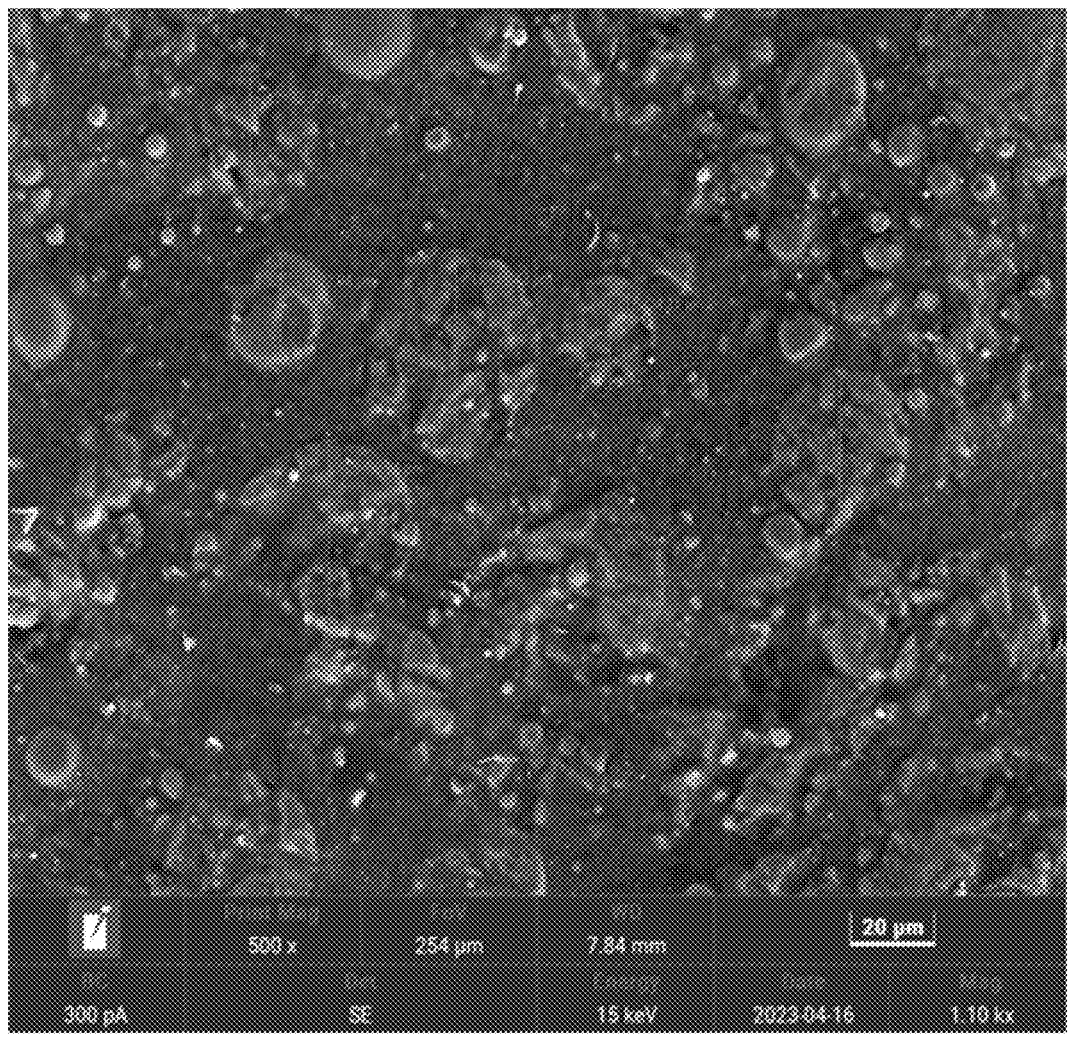
FIG. 3 is a scanning electron microscope image of silica with a D99 of 75 μm provided by Comparative Example 1 of the present disclosure.

As can be seen from Table 1, the present application can effectively reduce the coefficient of thermal expansion of the liquid epoxy molding compound during the molding stage. Since the degree of warpage of the liquid epoxy molding compound is related to its coefficient of thermal expansion, and the smaller the coefficient of thermal expansion, the smaller the degree of warpage, the warpage height of the liquid epoxy molding compound can be reduced and controlled to be close to or equal to 0 mm. Meanwhile, it can be seen from FIG. 3 that the refined silica particles have a larger specific surface area and a larger contact area with the epoxy resin, which makes the silica and the epoxy resin bond more closely, thereby reducing the coefficient of thermal expansion of the material.

One or more technical solutions in the embodiments of the present invention have at least the following technical effects or advantages: (1) the embodiments of the present application provide a liquid epoxy molding compound in which, compared with traditional liquid epoxy molding compound components, large-particle silica is ground into small-particle silica to reduce the increase in length of the liquid epoxy molding compound in a certain direction at the unit temperature during the molding stage, thereby effectively reducing both the coefficient of thermal expansion of the liquid epoxy molding compound during the molding stage and the warpage height of the liquid epoxy molding compound; and (2) the embodiments of the present application provide a liquid epoxy molding compound, which can not only form a low-warpage packaging structure during the process of forming the packaging structure but also reduce production costs and improve the packaging success rate of electronic products.

The above only describes the embodiments of the present disclosure, thereby enabling those skilled in the art to understand or implement the present disclosure. Various modifications to these embodiments will be readily apparent to a person skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A liquid epoxy molding compound, comprising the following raw materials by mass fraction:
    an inorganic silica filler: 83%-88%, 3,4-epoxycyclohexylmethyl-3',4'-epoxycyclohexylcarboxylate: 5%-10%, a tetrahydrophthalic anhydride curing agent: 5%-10%, and an accelerator: 0.1%-0.5%, wherein
    the raw materials are premixed to obtain a mixture;
    the mixture is ground to a target particle size, and then vacuum degassing is performed to obtain the liquid epoxy molding compound, wherein the target particle size is 25 μm-50 μm; a grinding machine with three rollers is used for the grinding, with a gap between inlets of the three rollers set to 50 μm-100 μm and a gap between outlets of the three rollers set to 25 μm-50 μm; and
    the inorganic silica filler with a particle size of less than 75 μm accounts for 99%.

2. The liquid epoxy molding compound of claim 1, wherein the accelerator comprises 2-ethyl-4-methylimidazole.

3. A method for preparing the liquid epoxy molding compound according to claim 1, comprising:
    premixing the raw materials to obtain a mixture; and grinding the mixture to a target particle size, and then performing vacuum degassing to obtain the liquid epoxy molding compound, wherein the target particle size is 25 μm-50 μm; a grinding machine with three rollers is used for the grinding, with a gap between inlets of the three rollers set to 50 μm-100 μm and a gap between outlets of the three rollers set to 25 μm-50 μm, and a vacuum degree of the vacuum degassing is ≤100 kPa.

4. The method of claim 3, wherein the premixing comprises premixing by combining a first revolution stirring and a first rotation stirring;

a speed of the first revolution stirring is 800 rpm-1400 rpm; and/or a speed of the first rotation stirring is 500 rpm-1000 rpm; and/or the premixing lasts for 150 s-300 s.

5. The method of claim 3, wherein the vacuum degassing comprises degassing by combining a second revolution stirring and a second rotation stirring;

a speed of the second revolution stirring is 800 rpm-1400 rpm; and/or a speed of the second rotation stirring is 80 rpm-140 rpm; and/or the degassing lasts for 60 s-90 s.

* * * * *